United States Patent
Danke

(10) Patent No.: US 12,258,061 B2
(45) Date of Patent: Mar. 25, 2025

(54) CHILD STANDING PLATFORM FOR A SHOPPING CART

(71) Applicant: Kim Danke, Battle Creek, MI (US)

(72) Inventor: Kim Danke, Battle Creek, MI (US)

( * ) Notice: Subject to any disclaimer, the term of this patent is extended or adjusted under 35 U.S.C. 154(b) by 92 days.

(21) Appl. No.: 18/307,081

(22) Filed: Apr. 26, 2023

(65) Prior Publication Data

US 2023/0347960 A1     Nov. 2, 2023

Related U.S. Application Data

(60) Provisional application No. 63/337,212, filed on May 2, 2022.

(51) Int. Cl.
 *B62B 3/14*     (2006.01)

(52) U.S. Cl.
 CPC .................. *B62B 3/1444* (2013.01)

(58) Field of Classification Search
 CPC ........ B62K 3/002; B62K 15/00; B62K 27/12; B62K 2015/001; B62J 1/08; B62B 3/1444; B62B 3/144; B62B 5/087
 See application file for complete search history.

(56) References Cited

U.S. PATENT DOCUMENTS

| | | | |
|---|---|---|---|
| 5,823,548 A | 10/1998 | Reiland | |
| 6,022,031 A * | 2/2000 | Reiland | B62B 3/144 |
| | | | 280/47.35 |
| 6,270,093 B1 * | 8/2001 | Johnson | B62B 3/144 |
| | | | 280/47.35 |
| 6,464,238 B2 * | 10/2002 | Reiland | B62B 3/144 |
| | | | 280/33.993 |
| 6,575,480 B2 | 6/2003 | McKelvy | |
| 7,093,841 B2 | 8/2006 | Conrad | |
| 7,722,058 B2 | 5/2010 | Giampavolo | |
| 7,971,884 B2 * | 7/2011 | Lundh | B62B 9/28 |
| | | | 280/47.38 |

(Continued)

FOREIGN PATENT DOCUMENTS

| | | | | |
|---|---|---|---|---|
| DE | 29719064 U1 * | 12/1997 | ............... | B62B 9/28 |
| GB | 2328907 A * | 3/1999 | ............... | B62B 9/28 |
| KR | 200480448 Y1 * | 5/2016 | | |

OTHER PUBLICATIONS

GB-2328907-A English Translation (Year: 1999).*
KR-200480448-Y1 English Translation (Year: 2016).*

*Primary Examiner* — James A Shriver, II
*Assistant Examiner* — Michael T. Walsh
(74) *Attorney, Agent, or Firm* — Brennan, Manna & Diamond, LLC

(57) ABSTRACT

The present invention relates to a releasably attached standing or level platform device for attachment to a wheeled shopping cart. The device has a generally level surface or trolley extension that releasably hooks onto a bottom of a shopping cart using a pair of hooks. The hooks are positioned at terminal ends of a rectangular U-shape arm that is attached to a telescoping arm. The U-shape arm is configured to be adjustable in width and the telescoping arm adjusts the height of the standing or level platform device. In use, a child stands on a top surface, and the wheels of the device track the movements of the wheels of the shopping cart thereby enabling the child to ride along with the wheeled cart without walking or without sitting in the wheeled shopping cart.

20 Claims, 6 Drawing Sheets

(56) References Cited

U.S. PATENT DOCUMENTS

| | | | |
|---|---|---|---|
| 10,137,921 B2* | 11/2018 | Lee | B62B 9/206 |
| 10,683,026 B2* | 6/2020 | Baron | B62B 9/28 |
| 2001/0035619 A1* | 11/2001 | Reiland | B62B 3/144 |
| | | | 280/47.38 |
| 2012/0217720 A1* | 8/2012 | Lai | B62B 9/28 |
| | | | 280/204 |
| 2016/0257331 A1* | 9/2016 | Nuske | B62B 9/26 |
| 2018/0370590 A1* | 12/2018 | van Leeuwen | B62K 27/12 |

* cited by examiner

CHILD STANDING PLATFORM FOR A SHOPPING CART

CROSS-REFERENCE TO RELATED APPLICATION

The present application claims priority to, and the benefit of, U.S. Provisional Application No. 63/337,212, which was filed on May 2, 2022, and is incorporated herein by reference in its entirety.

FIELD OF THE INVENTION

The present invention relates generally to the field of shopping carts. More specifically, the present invention relates to a novel attachment device for shopping carts that functions as a transportation tool for young children, enabling them to stand on the platform and be pushed, or pulled, along with the cart by their parent or guardian. The device has a square platform on which a child stands and is pushed, or pulled, along with the shopping cart. Accordingly, the present disclosure makes specific reference thereto. Nonetheless, it is to be appreciated that aspects of the present invention are also equally applicable to other like applications, devices, and methods of manufacture.

BACKGROUND

By way of background, physical shopping carts are used in retail stores and other shopping establishments such as grocery stores, home improvement stores, and more for providing customers with a way to collect and transport items to a checkout area. Commonly, toddlers and young children sit in the top area of a shopping cart when shopping in retail and grocery stores with their parents. This not only enables children to enjoy the shopping experience, but also keeps parents and/or caretakers free and relaxed. However, shopping carts are designed to accommodate young and small children due to the carts' size limitations and further, there is a threat of the carts being flipped over when a relatively grown (i.e. older and/or larger) child sits on the shopping cart.

Conventionally, as a child grows, the child may not fit in the seat of the shopping cart. During shopping, children are generally unable to walk for long periods of time and therefore, try to sit in the cart. Some children may try to hang on the sides of cart and end up tipping over the cart onto themselves which may cause injuries. Due to walking for long periods, some children may get bored and try to grab items off shelves, creating issues for parents and retailers while trying to shop. As a result, parents and retailers want a device that can enable even grown-up children to ride with a shopping cart without sitting in the cart.

Therefore, there exists a long-felt need in the art for a device that functions as a transportation tool for young children enabling them to be pushed, or pulled, along with the shopping cart by their parent and/or guardian. There is also a long-felt need in the art for a device that functions as a standing or level platform and can be attached to a shopping cart. Additionally, there is a long-felt need in the art for a device that eliminates need of children to sit in the shopping cart. Moreover, there is a long-felt need in the art for a device that prevents children from walking for long periods of time while shopping. Further, there is a long-felt need in the art for a device that is designed for older and/or bigger toddlers to ride with a shopping cart. Furthermore, there is a long-felt need in the art for a device that meets the special needs of children to enjoy/participate in the shopping experience. Finally, there is a long-felt need in the art for a device for shopping carts that offer a safe and fun way for children to shop with their parents and/or guardians.

The subject matter disclosed and claimed herein, in one embodiment thereof, comprises a shopping cart accessory device designed to releasably attach to a shopping cart. The accessory device functions as a transportation tool for young children, enabling them to stand on the platform and be pushed, or pulled, along with the cart by their parent and/or guardian. The device offers a safe and fun way for children to shop with their parents and/or guardians. The device has a square platform having a pair of casters attached on the bottom surface thereof, the casters are configured to mimic movement of front wheels of the shopping cart to which the device is attached, the square horizontal platform is designed for supporting a child who stands on the platform, the platform is releasably attached to the bottom portion of the shopping cart using a latching component, the latching component has a pair of U-shape hooks for engaging with the bottom portion of the shopping cart, the latching component is designed to adjust in width, the latching component is designed to adjust in height using a plurality of telescoping pins such that the U-shape hooks can be raised or lowered to engage with the shopping cart.

In this manner, the shopping cart accessory device of the present invention accomplishes all of the forgoing objectives and provides users with a standing or level platform that can be attached to a shopping cart for enabling young children to stand on the platform and be pushed, or pulled, along with the cart by their parent and/or guardian. The children do not hang on sides of the carts, do not create issues, and the device offers a safe and fun way for children to shop with their parents and/or guardians.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a shopping cart accessory device designed to releasably attach to a shopping cart. The accessory device functions as a transportation tool for young children, enabling them to stand on the platform and be pushed, or pulled, along with the cart by their parent or guardian. The device features a generally square horizontal platform to having a pair of casters attached on the bottom surface thereof, the casters are configured to pivot or swivel and follow, i.e., track, movement of wheels of the shopping cart, the generally square horizontal platform is designed for supporting a child standing thereon, a latching component integrated to the platform releasably attaches the device to the bottom portion of the shopping cart, the latching component has a pair of U-shape hooks for engaging with the bottom portion of the shopping cart, the latching component is designed to adjust in width, the latching component is designed to adjust in height using a plurality of telescoping pins such that the U-shape hooks can be raised or lowered to engage with the shopping cart.

In yet another embodiment, a secure standing or level platform designed to releasably attach to a shopping cart is disclosed. The standing or level platform is designed to be used as a shopping cart extension device and functions as a transportation tool for young children, enabling them to stand on the platform and be pushed, or pulled, along with the cart by their parent or guardian. The standing or level platform includes a generally square anti-slippery surface, a latching component connected to the surface, the latching component includes two L-shaped arms, each having a U-shape hook at the terminal end thereof, a rectangular cover designed to cover a portion of the said L-shaped arms, a pair of screws, each screw is accommodated in a groove disposed in the L-shaped arms for adjusting a width of the latching component, an L-shape connecting arm having a plurality of telescoping holes for adjusting the height of the latching components wherein the plurality of telescoping holes are aligned with a pair of holes disposed in the rectangular cover and a pair of screws are used for fastening the L-shape connecting arm with the rectangular cover.

In yet another embodiment, a shopping cart with an attached user standing or level platform is disclosed. The user standing or level platform can be integrated or releasably attached to the bottom of the shopping cart below the handle of the shopping cart. More specifically, the standing or level platform has a square platform for a user to stand on, a pair of casters for mimicking motion of wheels (i.e. front wheels) of the shopping cart, a latching component for attaching the platform to the shopping cart wherein the latching component is configured to be adjustable in width and height.

It is an object of the present invention to provide a new and improved shopping cart that has all of the advantages of the prior art shopping cart and none of the disadvantages, but also provides a standing or level platform for children. The standing or level platform is easily and efficiently manufactured and marketed and has a low cost of manufacture with regard to both materials and labor, and which accordingly is then amenable of low prices of sale to the consuming public, thereby making such shopping cart and platform economically available to the buying public.

Numerous objects, features and advantages of the shopping cart extension/accessory device will be readily apparent to those of ordinary skill in the art upon reading the following detailed description of presently preferred, but nonetheless illustrative, embodiments of the shopping cart extension/accessory device when taken in conjunction with the accompanying drawings. In this respect, before explaining the current embodiments of the shopping cart extension/accessory device in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
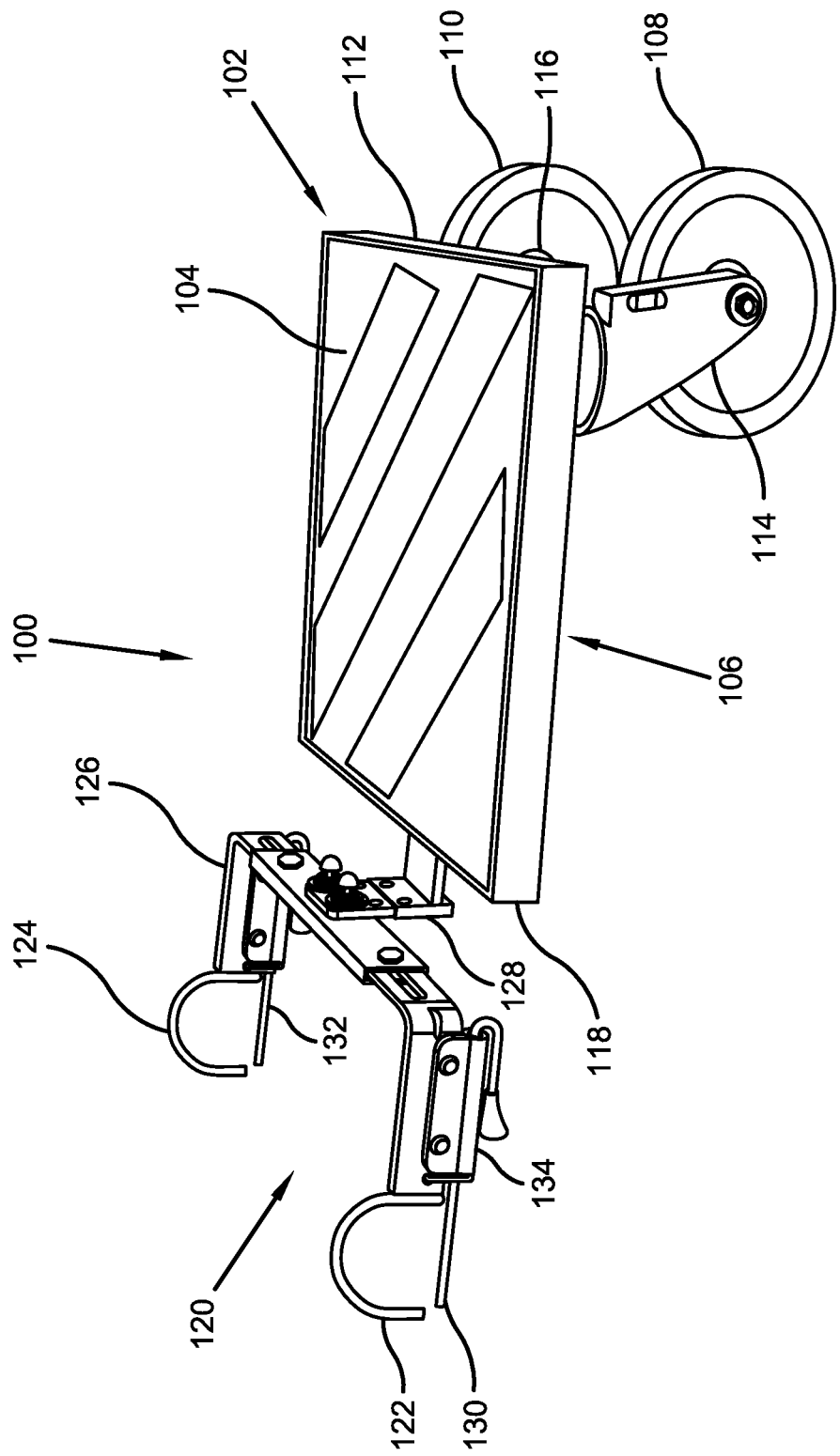
FIG. 1 illustrates a perspective view of one potential embodiment of a shopping cart extension device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that functions as a transportation tool for young children enabling them to be pushed, or pulled, along with the shopping cart by their parent or guardian. There is also a long-felt need in the art for a device that functions as a standing or level platform and can be attached to a shopping cart. Additionally, there is a long-felt need in the art for a device that eliminates need of children to sit in the shopping cart. Moreover, there is a long-felt need in the art for a device that prevents children from walking for long periods of time while shopping. Further, there is a long-felt need in the art for a device that is designed for older and/or bigger toddlers to ride with a shopping cart. Furthermore, there is a long-felt need in the art for a device that meets the special needs of children to enjoy/participate in the shopping experience. Finally, there is a long-felt need in the art for a device for shopping carts that offers a safe and fun way for children to shop with their parents and/or guardians.

The present invention, in one exemplary embodiment, is a shopping cart with a releasably attached child standing or level platform. The user standing or level platform can be integrated or releasably attached to the bottom of the shopping cart below the handle of the shopping cart. More specifically, the standing or level platform has a square platform for a user to stand on, a pair of casters for mimicking motion, or tracking motion, of wheels of the shopping cart, a latching component for attaching the platform to the shopping cart wherein the latching component is configured to be adjustable in width and height.

Referring initially to the drawings, FIG. 1 illustrates a perspective view of one potential embodiment of a shopping cart extension device of the present invention in accordance with the disclosed architecture. The shopping cart accessory 100 of the present embodiment is designed as a secured standing or level platform configured to releasably attach to a shopping cart. The standing or level platform accessory 100 is designed to function as a transportation tool for young children, enabling them to stand on a platform 102 of the accessory 100 and be pushed, or pulled, along with the cart by their parent or guardian. More specifically, the standing or level platform device 100 has a substantially horizontal generally square platform 102 having a top surface 104 and a bottom surface 106. The top surface 104 is used by a child for standing thereon and the bottom surface 106 is fastened to a pair of pivoting casters 108, 110. The pivoting, or swivel, casters 108, 110 are designed to mimic, or track, the motion of the wheels of the shopping cart to which the standing or level platform device 100 is releasably connected.

Figure 6:
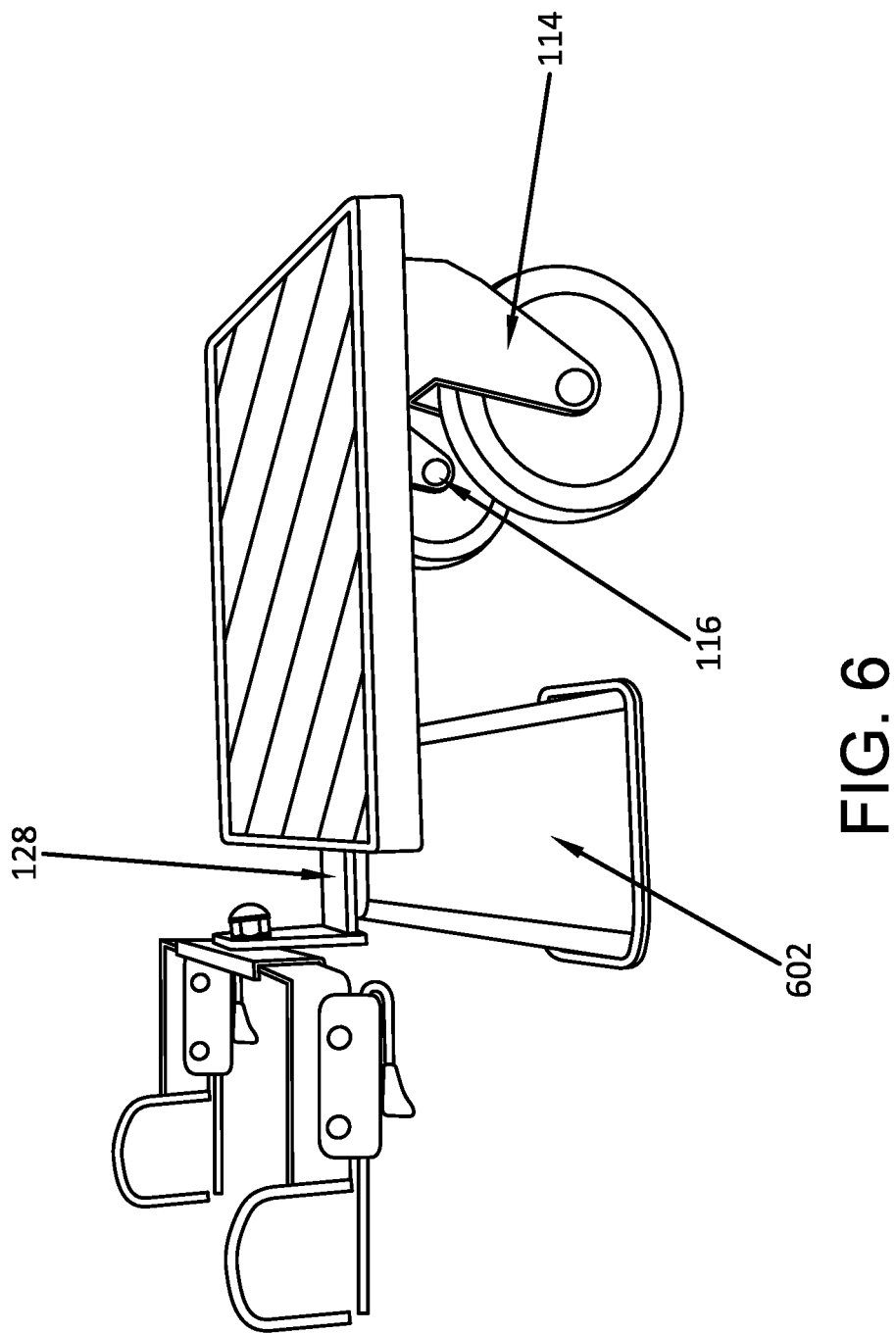
FIG. 6 illustrates a perspective view showing the casters of the extension device of the present invention in a second pivoting position in accordance with the disclosed architecture.

The casters 108, 110 are preferably positioned below (i.e. proximal to) the trailing edge 112 of the square platform 102 and the pivoting arms 114, 116 of the casters 108, 110 respectively are designed to move between a first position (pivoting away from the square platform 102) as shown in FIG. 1 and a second position (positioned below the platform 102) as shown in FIG. 6. A user manually pivots the pivoting arms 114, 116 from the first position to the second position and vice versa as per the preferences the user.

Figure 3:
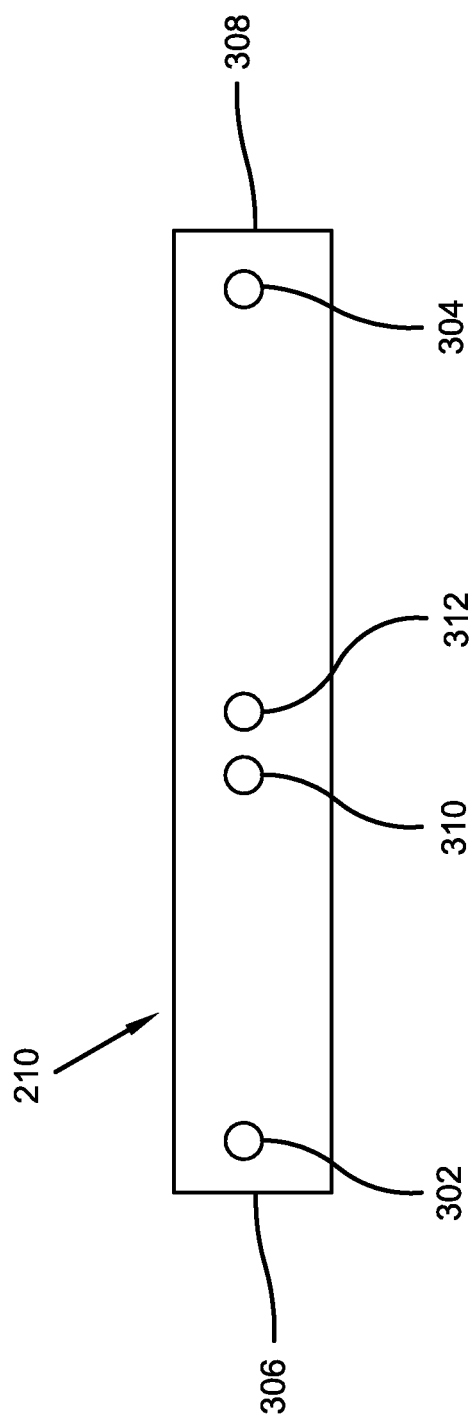
FIG. 3 illustrates a planar view of the rectangular cover used in the accessory device of the present invention in accordance with the disclosed architecture.

A latching connector portion 120 is integrally connected to a leading edge 118 of the square platform 102 and is used for releasably connecting the accessory 100 to the bottom frame of any shopping cart as displayed in FIG. 3. The latching connector portion 120 has a pair of U-shaped hooks 122, 124 positioned at the opposite terminal ends of the rectangular U-shaped arm 126. A L-shaped connecting arm 128 is releasably attached to the rectangular U-shaped arm 126 enabling a secure attachment of the square platform 102 with the latching connector portion 120.

More specifically, the U-shaped arm 126 has two separate L-shaped portions having a groove along the length thereof for extending or retracting the length of the arm 126. The L-shaped connecting arm 128 is telescoping for adjusting length of the latching connector portion 120 as illustrated in FIG. 2 to attach to the shopping carts of different heights.

For securing the connection of the U-shaped hooks 122, 124 with a shopping cart, an extendable hook supporting arm is provided for each U-shaped hook. As illustrated, the first extendable hook supporting arm 130 is configured to close any gap created during fastening of the U-shaped hook 122 with the shopping cart. The arm 130 is removably positioned through the loop 134 and can be released by pulling the arm 130 towards the square platform 102. A similar extendable hook supporting arm 132 is provided for the other U-shaped hook 124 for providing an overall secure attachment for the standing or level platform accessory 100.

The square platform 102 is non-slipping and may have a layer of rubber for providing adequate comfort and support to a child standing on the platform 102. The casters 108, 110 can be made from aluminum or rubber as per design configurations and are configured to run smoothly on any terrain. The accessory device 100 can support children of up to 30 kilograms (66 pounds) without fear of tilting of the shopping cart to which the accessory device 100 is attached. The dimensions of the square platform 102, in one exemplary configuration, is 10"×10" to support children of various ages. The height of the square platform 102 from the floor is from about 3" to about 8".

Figure 2:
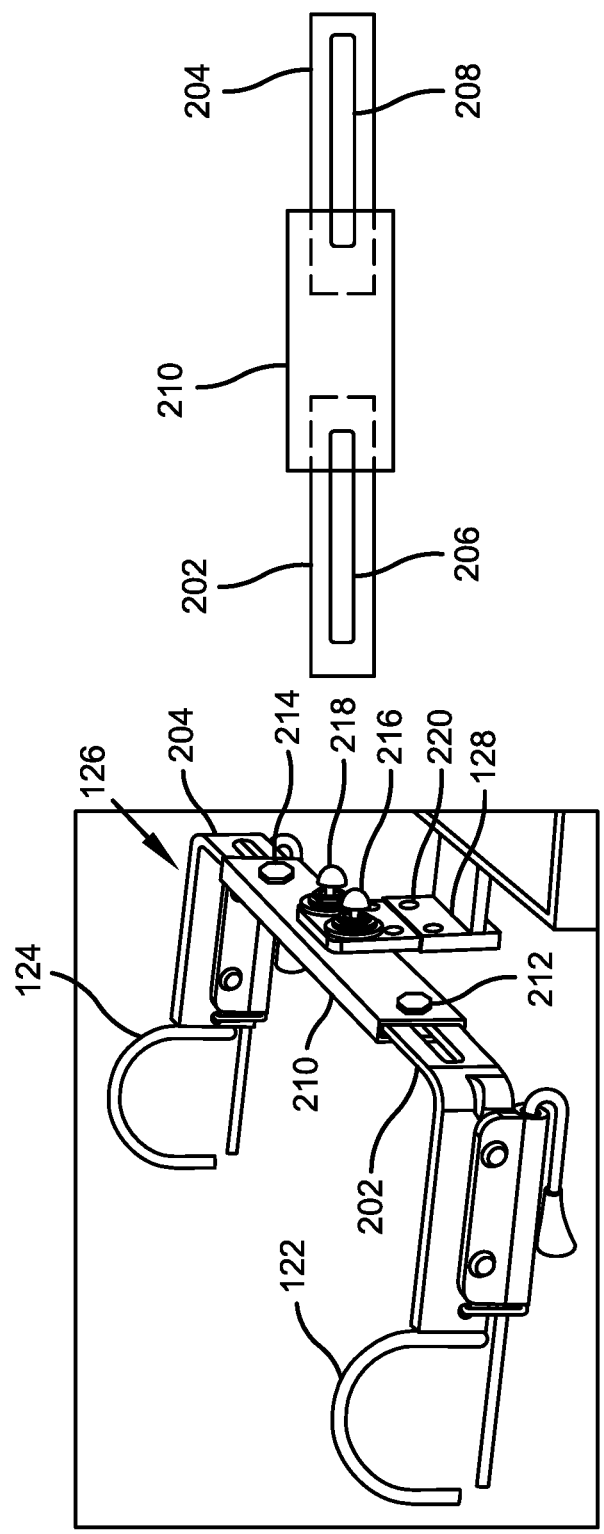
FIG. 2 illustrates an enlarged view of the latching portion used in the shopping cart accessory device of the present invention in accordance with the disclosed architecture.

FIG. 2 illustrates an enlarged view of the latching portion 120 used in the shopping cart accessory device 100 of the present invention in accordance with the disclosed architecture. The rectangular U-shaped arm 126 is formed of two separate L-shaped components 202, 204 wherein each component has a rectangular and continuous groove along the length thereof. As illustrated, the first L-shaped component 202 includes the groove 206 and the second L-shaped component 204 includes the groove 208 wherein a rectangular cover 210 is configured to partially overlap the grooves 206, 208.

The rectangular cover 210 has a pair of screws 212, 214 positioned on either side of L-shaped connecting arm 128 such that the screws 212, 214 are accommodated in the grooves 206, 208 respectively enabling the L-shaped components 202, 204 to laterally slide and lock in a desired position. The screws 212, 214 enable the L-shaped components 202, 204 to extend or retract and thus help in adjusting width of the U-shaped arm 126.

For adjusting height of the latching component 120 to fit to shopping carts of different heights, the L-shaped connecting arm 128 has a plurality of telescoping holes 220 for accommodating the telescoping pins 216, 218. In use, for adjusting height of the latching component 120, the telescoping pins 216, 218 are accommodated in a pair of the telescoping holes 220 to secure the L-shaped connecting arm 128 and the U-shaped arm 126.

The advantage of the latching components 120 is that it is adjustable both in width and height, thereby enabling the shopping cart accessory 100 to be compliant with all types of conventional shopping carts.

FIG. 3 illustrates a planar view of the rectangular cover used in the accessory device 100 of the present invention in accordance with the disclosed architecture. The rectangular cover 210 is configured to provide the adjustment in width and height of the latching component 120 of the device 100. More specifically, the rectangular cover 210 has a pair of holes 302, 304 positioned near the terminal ends 306, 308 of the cover 210, the holes 302, 304 are configured to receive and accommodate screws 212, 214 (shown in FIG. 2) for adjusting width of the rectangular U-shaped arm.

For accommodating pivoting pins 216, 218 in the cover 210 for adjusting height of the latching component 120, a pair of holes 310, 312 are disposed in the cover 210 such that the holes 310, 312 are aligned with a pair of pivoting holes of the L-shaped connecting arm 128 and the pivoting pins 216, 218 are passed through the pair of holes 310, 312 and the pivoting holes positioned in the L-shaped connecting arm 128.

Figure 4:
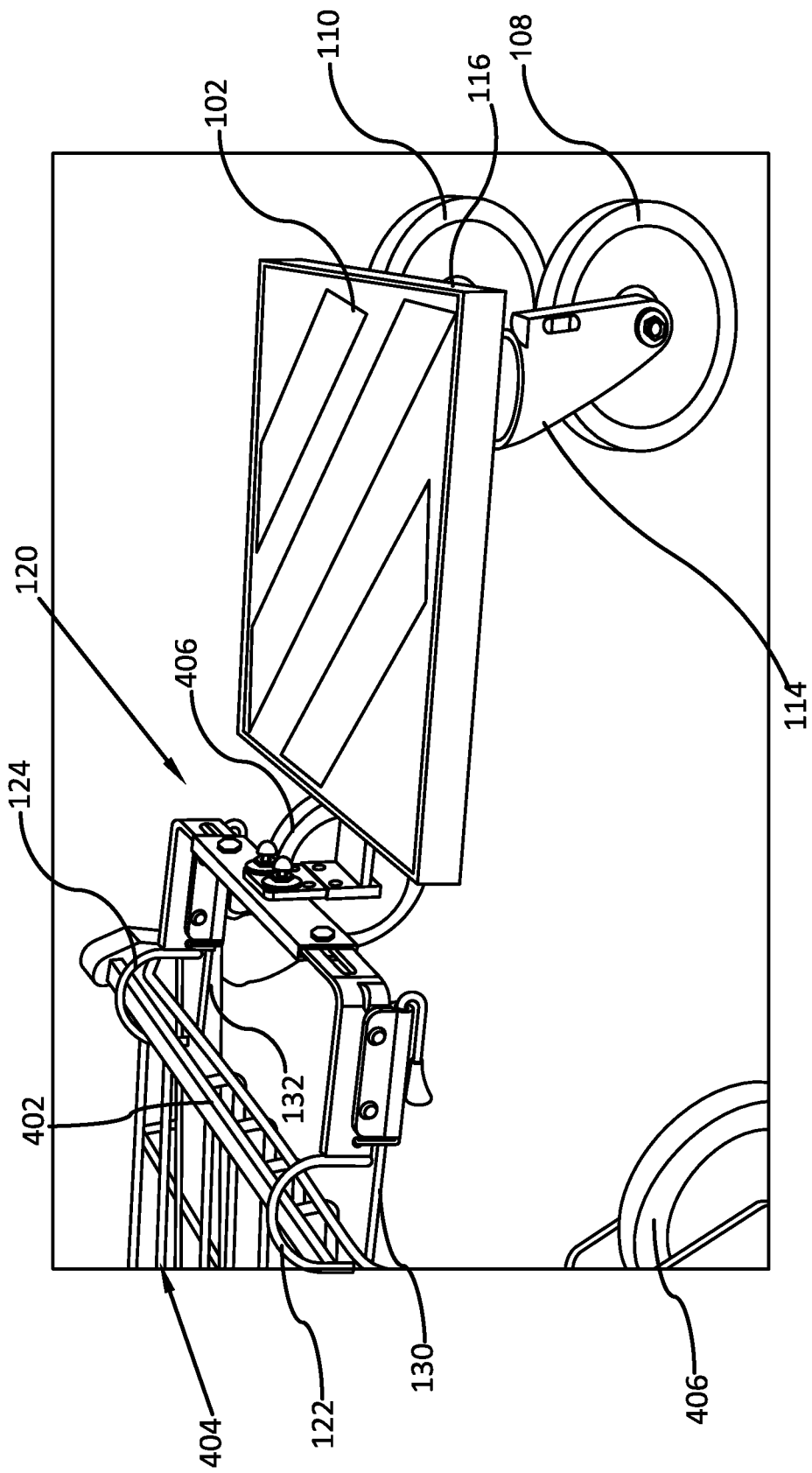
FIG. 4 illustrates a perspective view showing the standing accessory device of the present invention releasably attached to the bottom portion of a shopping cart in accordance with the disclosed architecture.

FIG. 4 illustrates a perspective view showing the standing accessory device 100 of the present invention releasably attached to the bottom portion of a shopping cart in accordance with the disclosed architecture. The U-shaped hooks 122, 124 are engaged to the bottom portion 402 of the shopping cart 404 such that the when the shopping cart 404 is pushed or pulled by a user, the U-shaped hooks 122, 124 are not detached from the bottom portion 402. The hook supporting arms 130, 132 also provide the additional support to the hooks 122, 124 respectively and prevent the hooks 122, 124 from getting released from the bottom portion 402.

Using the latching components 120, the casters 108, 110 move, or track, in the direction where wheels 406 of the shopping cart 404 move while the pivoting arms 114, 116 and the L-shaped connecting arm 128 support the square platform 102 for secure and stable movement of a child standing on the platform 102.

Figure 5:
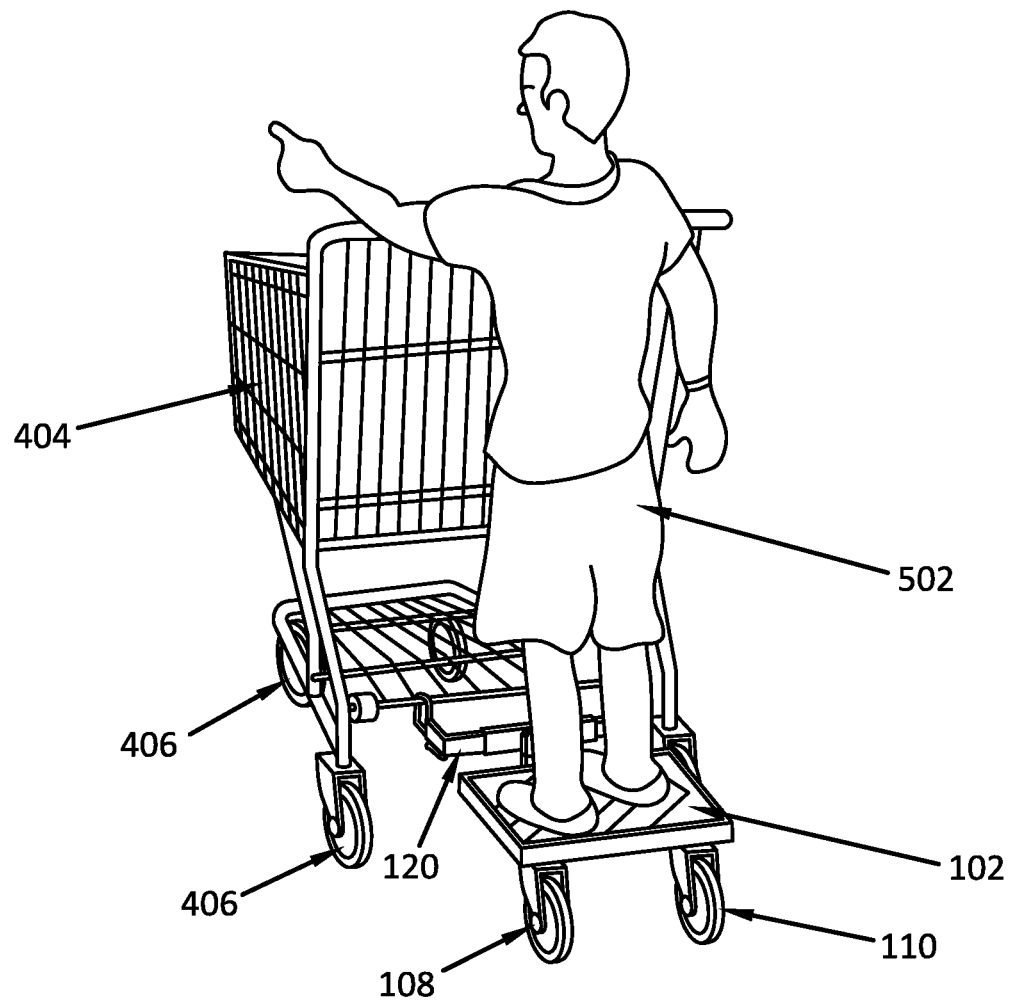
FIG. 5 illustrates a perspective view showing a child riding on the standing accessory device of the present invention in accordance with the disclosed architecture.

FIG. 5 illustrates a perspective view showing a child riding on the standing accessory device of the present invention in accordance with the disclosed architecture. As illustrated, the accessory device 100 is attached to the shopping trolley 404 in a manner described in other embodiments of the present invention such that the casters 108, 110 mimic the movement of the wheels 406. A child 502 easily stands on the platform 102 such that a parent or caretaker can easily pull or push the shopping cart 404 with the child 502 standing on the platform 102. The device 100 eliminates the requirement of the child 502 to sit in the trolley 404 and further, can accommodate children having weight up to 30 kilograms (66 pounds). The latching component 120 maintains a secure engagement with the shopping cart or trolley 404 thereby offering a safe and fun way for children to shop with their parents and/or guardians.

FIG. 6 illustrates a perspective view showing the casters of the extension device of the present invention in a second pivoting position in accordance with the disclosed architecture. In the present embodiment, the pivoting caster arms 114, 116 are pivoted below the bottom of the square platform 102 and can be used when the device 100 is not in use. Further, for supporting the device 100 in non-use condition, a support platform 602 can be placed below the L-shaped connecting arm 128.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "standing accessory device", "shopping cart extension device", "shopping cart accessory", "accessory", "device", and "standing or level platform accessory" are interchangeable and refer to the shopping cart extension device 100 of the present invention.

Notwithstanding the forgoing, the shopping cart extension device 100 of the present invention can be of any suitable size and configuration as is known in the art without affecting the overall concept of the invention, provided that it accomplishes the above stated objectives. One of ordinary skill in the art will appreciate that the shopping cart extension device 100 as shown in the FIGS. are for illustrative purposes only, and that many other sizes and shapes of the shopping cart extension device 100 are well within the scope of the present disclosure. Although the dimensions of the shopping cart extension device 100 are important design parameters for user convenience, the shopping cart extension device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A shopping cart accessory providing a standing platform, the shopping cart accessory comprising:
   a level platform having at least a first wheel for supporting said level platform thereabove and a connector for selectively attaching to a wheeled shopping cart;
   wherein said level platform having a non-slip top surface for a child to stand thereon;
   wherein said at least a first wheel swivels for tracking along with the wheeled shopping cart;
   wherein the connector comprises a pair of holes configured to receive and accommodate screws for adjusting width and height of the level platform; and
   wherein a support platform is placed below the connector for supporting the level platform when not in use.

2. The shopping cart accessory of claim 1, wherein said connector releasably attached to the wheeled shopping cart.

3. The shopping cart accessory of claim 2, wherein said level platform is pulled behind the wheeled shopping cart.

4. The shopping cart accessory of claim 3, wherein said level platform having a generally horizontal rectilinear platform.

5. The shopping cart accessory of claim 3, further comprising a second wheel for supporting said level platform thereabove.

6. The shopping cart accessory of claim 5, wherein said first wheel having a first pivoting arm and said second wheel having a second pivoting arm, and further wherein said first wheel pivots about said first pivoting arm and said second wheel pivots about said second pivoting arm for tracking said first wheel and said second wheel with the wheeled shopping cart.

7. The shopping cart accessory of claim 6, wherein said first pivoting arm and said second pivoting arm are positioned proximal to a trailing edge of said level platform.

8. The shopping cart accessory of claim 5, wherein said first wheel and said second wheel are swivel casters.

9. The shopping cart accessory of claim 8, wherein said swivel casters are positioned proximal to a trailing edge of said level platform.

10. The shopping cart accessory of claim 1, wherein said connector having a latching connector portion integrally connected to a leading edge of said level platform for the selective attaching to the wheeled shopping cart.

11. The shopping cart accessory of claim 10, wherein said latching connector portion releasably connected to a bottom frame of the wheeled shopping cart.

12. The shopping cart accessory of claim 11, wherein said latching connector portion having a U-shaped arm including a pair of U-shaped hooks for securing to the bottom frame of the wheeled shopping cart.

13. The shopping cart accessory of claim 12, wherein said U-shaped arm having a pair of separate L-shaped portions including a groove along a length thereof for extending or retracting the length of said U-shaped arm.

14. The shopping cart accessory of claim 13, wherein said L-shaped portions are telescoping for adjusting the length of said U-shaped arm.

15. The shopping cart accessory of claim 14, wherein said non-slip top surface is rubber.

16. A shopping cart accessory providing a standing platform, the shopping cart accessory comprising:
a level platform having a first wheel and a second wheel for supporting said level platform thereabove and a connector for selectively attaching to a wheeled shopping cart;
wherein said level platform having a non-slip top surface for a child to stand thereon;
wherein said first wheel and said second wheel swivel for tracking along with the wheeled shopping cart;
wherein said level platform is pulled behind the wheeled shopping cart;
wherein the connector comprises a pair of holes configured to receive and accommodate screws for adjusting width and height of the level platform; and
wherein a support platform is placed below the connector for supporting the level platform when not in use.

17. The shopping cart accessory of claim 16, wherein said first wheel having a first pivoting arm and said second wheel having a second pivoting arm, and further wherein said first wheel pivots about said first pivoting arm and said second wheel pivots about said second pivoting arm for tracking said first wheel and said second wheel with the wheeled shopping cart.

18. The shopping cart accessory of claim 17, wherein said first pivoting arm and said second pivoting arm are positioned proximal to a trailing edge of said level platform.

19. A shopping cart accessory providing a standing platform, the shopping cart accessory comprising:
a level platform having a first wheel and a second wheel for supporting said level platform thereabove and a connector for selectively attaching to a wheeled shopping cart;
wherein said level platform having a non-slip top surface for a child to stand thereon;
wherein said first wheel and said second wheel swivel for tracking along with the wheeled shopping cart;
wherein said level platform is pulled behind the wheeled shopping cart;
wherein said first wheel and said second wheel are swivel casters positioned proximal to a trailing edge of said level platform;
wherein the connector comprises a pair of holes configured to receive and accommodate screws for adjusting width and height of the level platform; and
wherein a support platform is placed below the connector for supporting the level platform when not in use.

20. The shopping cart accessory of claim 19, wherein said connector having a latching connector portion integrally connected to a leading edge of said level platform for the selective attaching to the wheeled shopping cart.

* * * * *